Sept. 8, 1953 J. L. SLONNEGER 2,651,692
CONDITION RESPONSIVE ELECTRIC SWITCH MECHANISM
Filed Nov. 19, 1952
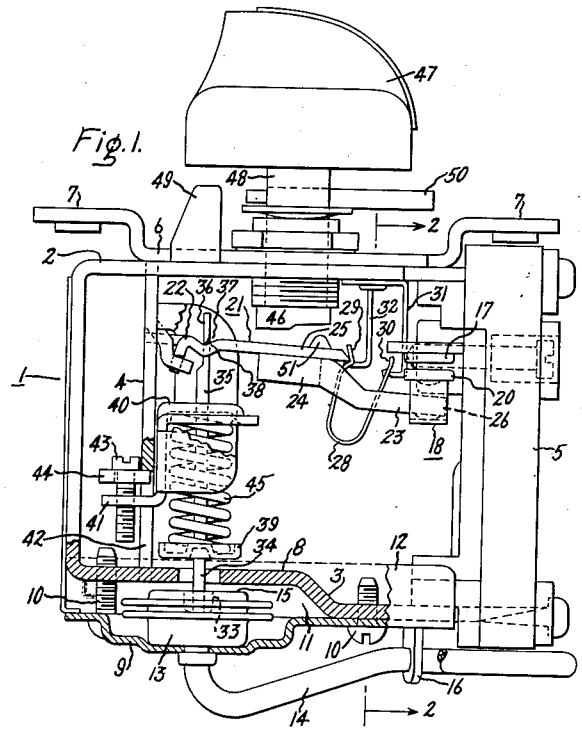
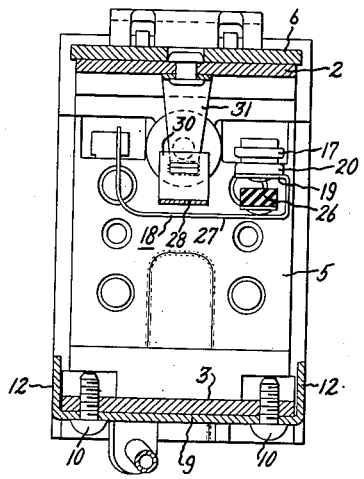
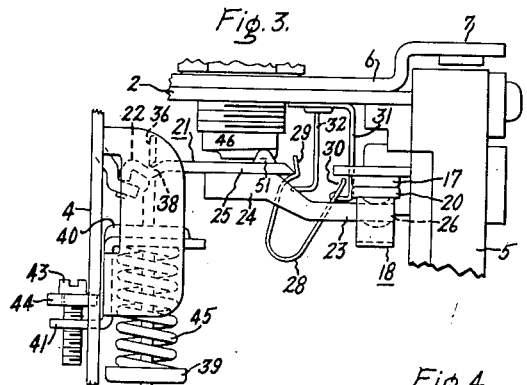
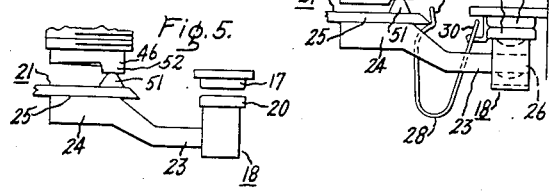
Inventor:
John L. Slonneger,
by *Robert G. Irish*
His Attorney.

Patented Sept. 8, 1953

2,651,692

UNITED STATES PATENT OFFICE 2,651,692

CONDITION RESPONSIVE ELECTRIC SWITCH MECHANISM

John L. Slonneger, Morrison, Ill., assignor to General Electric Company, a corporation of New York Application November 19, 1952, Serial No. 321,375

11 Claims. (Cl. 200—83)

This invention relates to electric switch mechanisms, and more particularly to mechanisms of the type which are actuated by an external condition such as temperature or pressure.

In the design of many machines, such as household refrigerators, it is customary to provide a switch which will automatically start the machine in response to a first predetermined condition, such as a predetermined upper temperature in the refrigerator, and which will subsequently stop the machine in response to a second predetermined condition, such as a predetermined lower temperature in the refrigerator. The condition responsive element in these switches is conventionally a pressure responsive expansible bellows which in turn is connected to a temperature responsive bulb which varies the pressure in the bellows responsive to the change in ambient temperature in the region of the bulb.

In the past, these switches have ordinarily been constructed to automatically stop the refrigerator, i. e. open the circuit of the compressor motor, at a selectively adjustable lower temperature and to start the machine at a predetermined number of degrees above the lower temperature, thus permitting adjustment of the average ambient temperature within the refrigerator. An objection to refrigerators equipped with such switches has been the necessity for periodically selecting temperatures that will permit melting and removal of the accumulation of frost from the evaporating unit, commonly known as defrosting. It will be readily understood that only a relatively small amount of frost accumulates on the evaporating unit during each operating cycle of the machine and, therefore, the objectionable periodic defrosting of the refrigerator could be eliminated if the frost accumulated during each cycle were removed after each cooling cycle and prior to the initiation of the next cycle. This defrosting of the evaporating unit after each cooling cycle may be accomplished by initiating operation of the refrigerator at a constant preset temperature several degrees above freezing, for example, 36° F. Thus, the frost which accumulates during each cooling cycle will be melted off after each cycle since the temperature of the evaporating unit will be permitted to rise sufficiently high to melt the frost prior to restarting of the compressor unit. With such an arrangement, however, it will be necessary to provide for manual adjustment of the lower temperature at which the compressor unit is turned off in order to control the average ambient temperature in the refrigerator.

It is therefore an object of this invention to provide an improved condition responsive electric switch characterized by its automatic contact closing in response to a first preset condition, such as a preset upper temperature in a refrigerator, and by its contact opening in response to a second predetermined condition, such as the lower temperature in the refrigerator, and further characterized by a provision for adjusting the device to determine the second or contact opening condition.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, there is provided a supporting member having a stationary contact mounted thereon. A movable contact is resiliently mounted on the supporting member and cooperates with and normally engages the stationary contact. An operating lever is pivotally mounted on the support and is arranged for movement between a first position and a second position, the operating lever in its second position moving the movable contact to the open position. A toggle spring is provided continuously biasing the operating lever toward its first position thereby closing the contacts, this spring being used in such a way that the first force required for causing initial deflection of the spring is greater than the force required to hold the spring in its deflected position. A coil spring is provided which biases the operating lever toward its second or contact open position and normally overpowers the toggle spring. An element movable in response to an external condition, such as a bellows, is arranged to oppose the coil spring so that the combined force of the bellows and the toggle spring overcome the force of the coil spring in response to a predetermined condition to close the contacts. Conversely, the force of the coil spring overcomes the combined forces of the bellows and the toggle spring to open the contacts in response to a second predetermined condition.

Thus, assuming that the contacts are initially closed and the refrigerator is operating, cooling of the interior of the refrigerator causes reduction of vapor pressure in the bellows until the coil spring is able to overcome the combined force of the bellows and the toggle spring to actuate the operating lever and thus open the contacts. It will be recalled that the toggle spring required less force to maintain it in the deflected or contact open position than in its initial position and thus, after the contacts are opened and the interior of the refrigerator begins to warm up, it will take a higher bellows pressure combined with the toggle spring force to overcome the coil spring force and close the contacts than was required to initially open them. Thus, the contacts will be opened at a first predetermined condition or temperature and closed at a second predetermined condition or temperature higher than the first.

In order to adjust the contact opening condition or temperature, means are provided to adjust the initial or first position of the operating lever thus adjusting the initial pressure required to deflect the toggle spring. It will be apparent that the reduction of force required to initiate deflection of the toggle spring downward will raise the condition or temperature at which the combined forces of the bellows and the toggle spring are overcome by the coil spring to open the contacts. Once deflected, however, a fixed amount of force is required to maintain the toggle spring in its deflected condition because the open contact position is fixed by the design and thus the contact closing condition or temperature will remain unchanged. Means are also provided to adjust the force exerted by the coil spring in order to preset the contact closing condition or temperature. However, this will normally be a factory adjustment and adjustment by the customer of the switch will ordinarily be made to the initial position of the operating lever in order to adjust the contact opening condition or temperature.

In the drawing,

Fig. 1 is a side elevational view, partly in section, illustrating the improved condition responsive electric switch of this invention;

Fig. 2 is a cross-sectional view of the switch of Fig. 1 taken along the line 2—2 of Fig. 1;

Fig. 3 is a fragmentary view of the switch of Fig. 1 showing the contacts closed and the adjusting cam at one extreme position;

Fig. 4 is another fragmentary view of the switch of Fig. 1 again showing the contacts closed and the adjusting cam 180° from the position of Fig. 3 and Fig. 5 is another showing the cam adjusted to the manual "off" position.

Referring now to the drawing, there is shown a substantially U-shaped metal frame or support 1 having an upper leg 2 and a lower leg 3. The frame 1 has a metal cross member 4 rigidly connected between the two legs 2 and 3. The free ends of legs 2 and 3 are attached to contact mounting member 5 formed of suitable insulating material. A mounting plate 6 is attached to leg 2 of support 1 and is provided with suitable countersunk tapped openings 7 to provide for attachment of the switch mechanism to other apparatus.

It will be seen that the bottom leg 3 of support 1 is provided with an indented portion 8 and bottom plate 9 which is secured to leg 3 in any suitable manner, as by screws 10, defines a cavity 11 with the indented portion 8 of the leg 3. Right angle side portions 12, as seen in Fig. 2, complete the enclosure of the cavity 11. A suitable condition responsive device, such as bellows 13, is positioned in cavity 11 and is connected by tube 14 to a source of vapor pressure responsive to temperature which actuates the bellows as will be hereinafter described. Bellows 13 is rigidly secured to the bottom plate 9 and when the vapor pressure therein is increased, the force on the upper surface 15 increases. The vertical spacing in the bellows enclosure 11 is preferably such that only a limited expansion of the bellows can take place before the upper surface 15 of the bellows contacts the indented portion 8 of arm 3 thus preventing damage to the bellows in the event of an abnormally high pressure. Tube 14 may be secured to the support 1 by means of a suitable bracket 16.

A stationary contact 17 is mounted on the interior face of the mounting member 5 and a cantilever spring 18 is also mounted on the interior surface of the mounting member 5. Cantilever spring 18 has a reversely turned portion 19 on which is mounted movable contact 20, the resiliency of the cantilever spring 18 normally biasing the movable contact 19 into engagement with the stationary contact 20. An operating lever 21 is provided having its end 22 pivotally mounted on the cross member 4 and having an extension 23 with its end 24 secured to the end 25 of operating lever 21 and its end 26 arranged between the reversely turned portion 19 and main portion 27 of cantilever spring 18.

It will be seen that operating lever 21 and its extension 23 operates between two positions, i. e. a first position as shown in Figs. 3 and 4 in which the contacts 17 and 20 are closed and a second position as shown in Fig. 1 where the end 26 of extension 23 of operating lever 21 engages the main portion 27 of cantilever spring 18 thus biasing the same to open contacts 17 and 20. Operating lever 21 is biased toward its first position by means of a non-overcenter toggle hairpin spring 28 having its end 29 engaging end 25 of operating lever 21 and its other end 30 engaging a bracket 31 which in turn is riveted to leg 2 of support member 1. As will be hereinafter more fully described, the non-overcenter toggle spring 28 is arranged so that it requires a greater force to deflect it from its normal or contact closed position as shown in Figs. 3 and 4 to its deflected or contact open position as shown in Fig. 1. A stop 32 is provided engaging the lower edge of end 25 of operating lever 21 in order to limit the downward movement of the lever. It will be seen that the cantilever spring 18 is transversely arranged with respect to the operating lever 21 and that the provision of the toggle spring pin 28 will provide snap action. Arm 21 engages cantilever spring 18 after moving through a portion of its stroke and thus opens contacts 19 and 20, as will hereinafter be more fully described.

The upper surface 15 of the bellows 13 is provided with an indentation 33 in which end 34 of vertically disposed operating rod 35 is arranged. The other end 36 of operating rod 35 projects through an opening adjacent end 22 of operating lever 21 and edge 37 engages and bears downwardly on indentation 38 of operating lever 21. A spring seat 39 is secured to operating rod 35 adjacent its lower end 34 and another spring seat 40 is provided having an opening through which operating rod 35 slidingly projects. Spring seat 40 is provided with an extension 41 projecting through a slot 42 in cross member 4 and adjusting screw 43 threadingly engages threaded openings in spring seat projection 41 and in bracket 44 formed on cross member 4. Thus, adjustment of screw 43 will move spring seat 40 upwardly or downwardly as will be hereinafter described. A coil spring 45 is provided arranged around operating rod 35 and held in compression between spring seats 39 and 40.

In order to provide for adjustment of the initial or contacts closed position of operating lever 21, a cam 46 is provided connected to adjusting knob 47 by means of a suitable shaft 48. A pair of stops are formed on the upper leg 2 of support 1, one of which is shown at 49 and a stop member 50 secured in a suitable opening in shaft 48 engages the stop 49 and its companion on the other side of leg 2 (not shown) to limit the rotation of knob 47, shaft 48 and cam 46. A suitable projection 51 is formed on the upper surface of end 25 of operating lever 21 and engages the surface of cam 50 as will be hereinafter described.

For a description of the operation of this device, reference is initially made to Figs. 3 and 1. Referring first to Fig. 3, it is assumed that the temperature within the refrigerator is above the predetermined shutoff point and that, therefore, the contacts 17 and 20 are closed. It will be seen that toggle spring 28 tends to bias the operating lever 21 upwardly so that contacts 17 and 20 are closed while coil spring 45 tends to expand downwardly thus biasing operating rod 39 against the upper surface 15 of bellows 13 and tending to bias operating lever 21 into its downward or contacts open position. When the contacts 17 and 20 are closed, however, and operating arm 21 is in its upper position with projection 51 engaging cam 46, the upward pressure exerted by bellows 13 together with the force exerted by toggle spring 28 overcomes the downward force exerted by coil spring 45. As the refrigerator operates and the ambient temperature within the box gets colder, vapor pressure in bellows 13 decreases, thus exerting progressively less upward force on coil spring 45 until finally a point is reached where the downward force exerted by the coil spring 45 equals the combined upward pressure exerted by the bellows 13 and the force necessary to deflect toggle spring 28 from its position as shown in Figs. 3 and 4 to its deflected position as shown in Fig. 1. At this point, toggle spring 28 will be deflected to its second or deflected position and since, as pointed out above, a higher pressure is necessary to initially deflect the spring than is required to maintain it in its deflected position, a snap action is produced causing extension 26 of arm 23 of operating lever 21 to strike lower portion 27 of cantilever spring 18 to rapidly open contacts 17 and 20, thus stopping the compressor motor of the refrigerator.

When the compressor motor is stopped, the ambient temperature in the refrigerator will begin to rise thus causing vapor pressure in bellows 13 to increase. Expansion of bellows 13 is opposed by coil spring 45 and aided by toggle spring 28. Here, as the upward pressure exerted by the bellows increases, the resultant downward force on the toggle spring 28 will decrease and eventually, this force will become less than the force required to maintain the toggle spring 28 in its deflected position as shown in Fig. 1 therefore the operating lever 21 will snap back to its initial position as shown in Figs. 3 and 4 thus closing contacts 17 and 20. As pointed out above, since the downward force required to maintain toggle spring 28 in its deflected position as shown in Fig. 1 is much lower than the force required to initially deflect it into its deflected position, the temperature at which the spring 28 will be deflected back to its initial position is much higher than the temperature at which it will be deflected from its initial position.

It is now seen that the mechanism thus far described will cause opening of the contacts 17 and 20 and the stopping of the refrigerator when a lower predetermined temperature is reached and subsequent closing of the contacts to again start the refrigerator when an upper predetermined temperature is reached. It has also been pointed out that it is desirable that this upper temperature be constant and somewhat above freezing in order to provide for automatic defrosting of the evaporator unit and that the lower shutoff temperature be adjustable in order to adjust the average ambient temperature in the refrigerator. In order to adjust the lower or contact opening temperature, the cam 46 controlled by knob 47 is utilized. It will be seen in Figs. 3 and 4 that in the contact closed position, projection 51 on operating lever 21 engages cam 46. In Fig. 3, cam 46 is shown as being rotated to one extremity so that operating lever 21 has been biased to its uppermost position under the influence of toggle spring 28 thus moving toggle spring 28 to its left-most position. In this position, the maximum pressure is required to deflect spring 28 into its deflected position shown in Fig. 1. Thus, in this position of cam 46, coil spring 45 must exert a greater portion of its effort in deflection of spring 28 thus requiring a lower opposing pressure in bellows 13 and thus a lower temperature. As cam 46 is rotated 180° by knob 47 as shown in Fig. 4, projection 51 moves operating lever 21 downwardly thus deflecting toggle spring 28 toward the right and reducing the initial force necessary to deflect it to its deflected position shown in Fig. 1. Thus, with toggle spring 28 in the position shown in Fig. 4, a lower force is needed to deflect the spring thus requiring less of the total force exerted by coil spring 45 resulting in a higher opposing pressure in the bellows 13. It will thus be seen that with cam 46 adjusted so that operating lever 21 is in its uppermost position when contacts 17 and 20 are closed, the contacts will be opened responsive to the lowest pressure in bellows 13 corresponding to the lowest temperature in the refrigerator whereas with cam 46 moved 180° as shown in Fig. 4 operating lever 21 is in its lowest position with contacts 19 and 20 closed. The contacts will be opened responsive to the highest pressure in bellows 13 corresponding to the highest temperature in the interior of the refrigerator required to open the contacts. It will be readily seen that the amount of force required to be exerted by coil spring 45 to retain toggle spring 28 in its deflected position as shown in Fig. 1 is the same regardless of the position of cam 46 since deflected toggle spring 28 always assumes the same position. Thus, spring 28 will always snap back to its initial position when bellows 13 exerts the same pressure corresponding to the same highest temperature condition in the interior of the refrigerator. It is thus seen that with this device, the contacts 17 and 20 will be opened responsive to a lower condition or temperature determined by positioning of cam 46 while the contacts will be closed responsive to a constant upward condition or temperature.

It may, of course, be desirable to preset the upper condition or temperature at which the contacts 17 and 20 close and this is provided by adjustment of screw 43 which in turn moves spring seat 40 to adjust the initial compression of spring 45. It will be seen that while the force required to hold toggle spring 28 in its deflected position is constant and the pressure exerted by bellows 13 for any given temperature is also constant, the force exerted by compression spring 45 may be adjusted by screw 43 and thus the bellows pressure which will overcome the force applied by spring 45, thus permitting toggle spring 28 to return to its initial position as determined by setting of screw 43. As pointed out above, this will normally be a factory adjustment with all subsequent adjustments being made by means of knob 47 and cam 46.

Stop 50 is arranged to permit movement of cam 46 beyond 180° from the position of Fig. 3 thus causing projection 51 on arm 21 to ride up on raised portion 52 of cam 46 thereby opening contacts 17 and 20, as shown in Fig. 5. This feature provides a manual "off" or contacts open position when it is desired to shut down the machine.

It will now be seen that this invention provides an improved and simple condition responsive switch which will automatically open its contacts in response to a lower predetermined condition and automatically close the contacts in response to an upper predetermined condition, the lower condition at which the contacts will open being adjustable while the upper condition is constant. This arrangement thus permits use of this switch in a refrigerator to provide automatic defrosting of the evaporator unit by presetting the upper condition to a temperature above freezing so that the frost on the evaporator is melted prior to the starting of each cooling cycle and by providing adjustment of the lower or contact opening temperature in order to permit adjustment of the desired average ambient temperature within the refrigerator.

While I have illustrated and described a specific embodiment of this invention, further modifications and improvements will occur to those skilled in the art. I desire it to be understood, therefore, that this invention is not limited to the form shown and I intend in the appended claims to cover all modifications which do not depart from the spirit and scope of this invention.

What I claim as new and desire to secure by Letters Patent of the United States is:

1. A condition responsive electric switch comprising a support, a stationary contact mounted on said support, a movable contact resiliently mounted on said support cooperating with and normally engaging said stationary contact, an operating lever pivotally mounted on said support for movement between a first position and a second position, said operating lever in its second position moving said movable contact to open said contacts, a toggle spring means continually biasing said operating lever toward its first position thereby closing said contacts, said toggle spring being arranged so that a first force is required for deflection to open said contacts and a lower force required to hold it in its deflected position, second spring means biasing said operating lever toward its second position and normally overpowering said toggle spring means thereby to open said contacts, an element movable in response to an external condition arranged to oppose said second spring means whereby the combined forces of said element and said toggle spring means overcome said second spring means in response to a first predetermined external condition thereby to close said contacts and said second spring means overcomes said combined forces in response to a second predetermined external condition thereby to open said contacts, and adjusting means operatively engaging said operating lever and arranged selectively to adjust said first position of said operating lever thereby to adjust the stroke thereof and the force required to deflect said toggle spring means whereby said first predetermined condition to open said contacts is determined.

2. A condition responsive electrical switch comprising a support, a stationary contact mounted on said support, a resilient member mounted on said support, a movable contact mounted on said resilient member and cooperating with said stationary contact, said resilient member normally biasing said contacts to the closed position, an operating lever pivotally mounted on said support for movement between a first position and a second position, said operating lever in its second position engaging said resilient member thereby to open said contacts, a toggle spring means continually biasing said operating lever toward its first position thereby closing said contacts, said toggle spring means being arranged so that a first force is required for deflection to open said contacts and a lower force required to hold it in its deflected position, second spring means biasing said operating lever toward its second position and normally overpowering said toggle spring means thereby to open said contacts, an element expansible in response to an external condition arranged to oppose said second spring means whereby the combined forces of said element and said toggle spring means overcome said second spring means in response to a first predetermined external condition thereby to close said contacts and said second spring means overcomes said combined forces in response to a second predetermined external condition thereby to open said contacts, and adjusting means operatively engaging said operating lever and arranged selectively to adjust said first position of said operating lever thereby to adjust the stroke thereof and the force required to deflect said first spring means whereby said first predetermined condition to open said contacts is determined.

3. A condition responsive electrical switch comprising a support, a stationary contact mounted on said support, an elongated resilient member having one end secured to said support, a movable contact mounted on the other end of said resilient member and cooperating with said stationary contact, said resilient member normally biasing said contacts to the closed position, an operating lever pivotally mounted on said support for movement between a first position and a second position, said operating lever in its second position engaging said resilient member thereby to open said contacts, a non-overcenter toggle spring continually biasing said operating lever toward its first position thereby closing said contacts, said non-overcenter spring being arranged so that a first force is required for deflection to open said contacts and a lower force required to hold in its deflected position, second spring means biasing said operating lever toward its second position and normally overpowering said non-overcenter spring thereby to open said contacts, an element expansible in response to an external condition arranged to oppose said second spring means whereby the combined forces of said element and said non-overcenter spring overcome said second spring means in response to a first predetermined external condition thereby to close said contacts and said second spring means overcomes said combined forces in response to a second predetermined external condition thereby to open said contacts, and adjusting means operatively engaging said operating lever and arranged selectively to adjust said first position of said operating lever thereby to adjust the stroke thereof and the force required to deflect said non-overcenter spring whereby said first predetermined condition to open said contacts is determined.

4. A condition responsive electrical switch comprising a support, a stationary contact mounted on said support, an elongated resilient member having one end secured to said support, a movable contact mounted on the other end of said resilient member and cooperating with said stationary contact, said resilient member normally biasing said contacts to the closed position, an operating lever pivotally mounted on said support for movement between a first position and a second position, said operating lever in its second position engaging said resilient member thereby to open said contacts, a non-overcenter hairpin toggle spring having one end engaging said operating lever and its other end engaging said support continually biasing said operating lever toward its first position thereby closing said contacts, said non-overcenter spring being arranged so that a first force is required for deflection to open said contacts and a lower force required to hold it in its deflected position, second spring means biasing said operating lever toward its second position and normally overpowering said non-overcenter spring thereby to open said contacts, an element expansible in response to an external condition arranged to oppose said second spring means whereby the combined forces of said element and said non-overcenter spring overcome said second spring means in response to a first predetermined external condition thereby to close said contacts and said second spring means overcomes said combined forces in response to a second predetermined external condition thereby to open said contacts, and adjusting means operatively engaging said operating lever in its first position and arranged selectively to adjust said first position of said operating lever thereby to adjust the stroke thereof and the force required to deflect said non-overcenter spring whereby said first predetermined condition to open said contacts is determined.

5. A condition responsive electrical switch comprising a support, a stationary contact mounted on said support, a cantilever spring having one end secured to said support and having a reversely turned portion formed at its other end, a movable contact mounted on said reversely turned portion of said cantilever spring and cooperating with said stationary contact, said cantilever spring normally biasing said contacts to the closed position, an operating lever having one end pivotally mounted on said support thereby permitting movement of its other end between a first position and a second position, said operating lever being transversely disposed with respect to said cantilever spring, said other end of said operating lever in the second position thereof engaging said cantilever spring thereby to open said contacts, a non-overcenter hairpin toggle spring having one end engaging said operating lever and its other end engaging said support and continuously biasing said operating lever toward its first position thereby closing said contacts, said non-overcenter spring being arranged so that a first force required for deflection to open said contacts and a lower force required to hold it in its deflected position, second spring means biasing said operating lever toward its second position and normally over-powering said non-overcenter spring thereby to open said contacts, a bellows expansible in response to an external condition arranged to oppose said second spring means whereby the combined forces of said bellows and said non-overcenter spring overcome said second spring means in response to a first predetermined external condition thereby to close said contacts and said second spring means overcomes said combined forces in response to a second predetermined external condition thereby to open said contacts, and a cam operatively engaging said operating lever in its first position and arranged selectively to adjust said first position of said operating lever thereby to adjust the stroke thereof and the force required to deflect said non-overcenter spring whereby said first predetermined condition to open said contacts is determined.

6. A condition responsive electrical switch comprising a support, a stationary contact mounted on said support, a movable contact resiliently mounted on said support cooperating with and normally engaging said stationary contact, an operating lever pivotally mounted on said support for movement between a first position and a second position, said operating lever in its second position moving said movable contact to open said contacts, a toggle spring means continuously biasing said operating lever toward its first position thereby closing said contacts, said toggle spring means being arranged so that a first force is required for deflection to open said contacts and a lower force required to hold it in its deflected position, an element expansible in response to an external condition, an operating rod seated on the upper surface of said element and arranged to engage said operating lever thereby moving the same to its second position responsive to contraction of said element, a second spring biasing said operating rod against said upper surface of said element and normally overpowering said toggle spring means thereby to open said contacts whereby the combined forces of said element and said toggle spring means overcome said second spring in response to a first predetermined external condition thereby to close said contacts and said second spring overcomes said combined forces in response to a second predetermined external condition thereby to open said contacts, and adjusting means operatively engaging said operating lever in its first position and arranged selectively to adjust said first position of said operating lever thereby to adjust the stroke thereof and the force required to deflect said first spring means whereby said first predetermined condition to open said contacts is determined.

7. A condition responsive electrical switch comprising a support, a stationary contact mounted on said support, a movable contact resiliently mounted on said supports cooperating with and normally engaging said stationary contact, an operating lever pivotally mounted on said support for movement between a first position and the second position, said operating lever in its second position moving said movable contact to open said contacts, a non-overcenter toggle spring continuously biasing said operating lever toward its first position thereby closing said contacts, said non-overcenter spring being arranged so that a first force is required for deflection to open said contacts and a lower force required to hold it in the deflected position, an element expansible in response to an external condition, an operating rod seated on the upper surface of said element and arranged to engage said operating lever thereby moving the same to its second position responsive to contraction of said element, a second spring biasing said operating rod against said upper surface of said element and normally overpowering said non-overcenter spring thereby to open said contacts whereby the combined forces of said element and said non-overcenter spring overcome said second spring means in response to a first predetermined external condition thereby to close said contacts and said second spring overcomes said combined forces in response to a second predetermined external condition thereby to open said contacts, and adjusting means operatively engaging said operating lever in its first position and arranged selectively to adjust said first position of said operating lever thereby to adjust the stroke thereof and the force required to deflect said non-overcenter spring whereby said first predetermined condition to open said contacts is determined.

8. A condition responsive electrical switch comprising a support, a stationary contact mounted on said support, a movable contact resiliently mounted on said support and cooperating with and normally engaging said stationary contact, an operating lever pivotally mounted on said support for movement between a first position and a second position, said operating lever in its second position moving said movable contact to open said contacts, a non-overcenter hairpin toggle spring having one end engaging said operating lever and its other end engaging said support and continuously biasing said operating lever toward its first position thereby closing said contacts, said non-overcenter spring being arranged so that a first force is required for deflection to open said contacts and a lower force required to hold it in its deflected position, a bellows expansible in response to an external condition, an operating rod seated on the upper surface of said bellows and arranged to engage said operating lever thereby moving the same to its second position responsive to contraction of said bellows, a second spring biasing said operating rod against said bellows normally overpowering said non-overcenter spring thereby to open said contacts whereby the combined forces of said bellows and said non-overcenter spring overcomes said second spring in response to a first predetermined external condition thereby to close said contacts and said second spring overcomes said combined forces in response to a second predetermined external condition thereby to open said contacts, and adjusting means operatively engaging said operating lever in its first position and arranged selectively to adjust said first position of said operating lever thereby to adjust the stroke thereof and the force required to deflect said non-overcenter spring whereby said first predetermined condition to open said contacts is determined.

9. A condition responsive electrical switch comprising a support, a stationary contact mounted on said support, a movable contact resiliently mounted on said support and cooperating with and normally engaging said stationary contact, an operating lever pivotally mounted on said support for movement between a first position and a second position, said operating lever in its second position moving said movable contact to open said contacts, a non-overcenter hairpin toggle spring having one end engaging said operating lever and its other end engaging said support and continuously biasing said operating lever toward its first position thereby closing said contacts, said non-overcenter spring being arranged so that a first force is required for deflection to open said contacts and a lower force required to hold it in the deflected position, a bellows expansible in response to an external condition, an operating rod seated on the upper surface of said bellows and arranged to engage said operating lever thereby moving the same to its second position responsive to contraction of said bellows, a first spring seat formed on said support, a second spring seat formed on said operating rod and spaced from said first spring seat, a compression spring positioned on said rod between said spring seats and biassing said operating rod against said upper surface of said bellows, said compression spring normally overpowering said overcenter spring thereby to open said contacts whereby the combined forces of said bellows and said non-overcenter spring overcomes said compression spring in response to a first predetermined external condition thereby to close said contacts and said compression spring overcomes said combined forces in response to a second predetermined external condition thereby to open said contacts, and a cam operatively engaging said operating lever and arranged selectively to adjust said first position of said operating lever thereby to adjust the stroke thereof and the force required to deflect said non-overcenter spring whereby said first predetermined condition to open said contacts is determined.

10. A condition responsive electrical switch comprising a support, a stationary contact mounted on said support, a cantilever spring having one end secured to said support and having a reversely turned portion formed at its other end, a movable contact mounted on said reversely turned portion of said cantilever spring and cooperating with said stationary contact, said cantilever spring normally biasing said contacts to the closed position, an operating lever having one end pivotally mounted on said support thereby permitting movement of its other end between a first position and a second position, said operating lever being transversely disposed with respect to said cantilever spring, said other end of said operating lever in the second position thereof engaging said cantilever spring thereby to open said contacts, a non-overcenter hairpin toggle spring having one end engaging said operating lever and its other end engaging said support and continuously biasing said operating lever toward its first position thereby closing said contacts, said non-overcenter spring being arranged so that a first force is required for deflection to open said contacts and a lower force required to hold it in its deflected position, a bellows expansible in response to an external condition, an operating rod seated on the upper surface of said bellows and arranged to engage said operating lever thereby moving the same to its second position responsive to contraction of said bellows, a first spring seat formed on said support, a second spring seat formed on said operating rod and spaced from said first spring seat, a coil spring positioned on said rod in compression between said spring seats and biasing said operating rod against said upper surface of said bellows, said coil spring normally overpowering said non-overcenter spring thereby to open said contacts whereby the combined forces of said element and said non-overcenter spring overcome said coil spring in response to a first predetermined external condition thereby to close said contacts and said coil spring overcomes said combined forces in response to a second predetermined external condition thereby to open said contacts, first adjusting means arranged selectively to adjust the position of said first spring seat thereby to adjust the compression of said coil spring whereby said second predetermined condition to close said contacts is determined, and a cam operatively engaging said operating lever in its first position and arranged selectively to adjust said first position of said operating lever thereby to adjust the stroke thereof and the force required to deflect said non-overcenter spring whereby said first predetermined condition to open said contacts is determined.

11 A condition responsive electrical switch comprising a support, a stationary contact mounted on said support, a cantilever spring having one end secured to said support and having a reversibly turned portion formed at its other end, a movable contact mounted on said reversibly turned portion of said cantilever spring and cooperating with said stationary contact, said cantilever spring normally biasing said contacts to the closed position, an operating lever having one end pivotally mounted on said support thereby permitting movement of its other end between a first position and a second position, said operating lever being transversely disposed with respect to said cantilever spring, said other end of said operating lever in the second position thereof engaging said cantilever spring thereby to open said contacts, a non-overcenter hairpin toggle spring having one end engaging said operating lever and its other end engaging said support and continuously biasing said operating lever toward its first position thereby closing said contacts, said non-overcenter spring having a first force required for deflection to open said contacts and a lower force required to hold it in its deflected position, second spring means biasing said operating lever toward its second position and normally overpowering said non-overcenter spring thereby to open said contacts, a bellows expansible in response to an external condition arranged to oppose said second spring means whereby the combined forces of said bellows and said non-overcenter spring overcomes said second spring means in response to a first predetermined external condition thereby to close said contacts and said second spring means overcome said combined forces in response to a second predetermined external condition thereby to open said contacts, and a cam operatively engaging said operating lever in its first position and arranged selectively to adjust said first position of said operating lever thereby to adjust the stroke thereof and the force required to deflect said non-overcenter spring whereby said first predetermined condition to open said contacts is determined, said cam having a raised portion arranged to move said operating lever sufficiently to open said contacts.

JOHN L. SLONNEGER

References Cited in the file of this patent

UNITED STATES PATENTS

| Number | Name | Date |
|---|---|---|
| 1,011,918 | Cheney | Dec. 19, 1911 |
| 2,458,518 | Kohl | Jan. 11, 1949 |
| 2,503,082 | Tuttle | Apr. 4, 1950 |
| 2,537,431 | Stickel | Jan. 9, 1951 |